US006538132B1

(12) United States Patent
Besemer et al.

(10) Patent No.: US 6,538,132 B1
(45) Date of Patent: Mar. 25, 2003

(54) PROCESS FOR REGENERATING PERIODIC ACID

(75) Inventors: Arie Cornelis Besemer, Amerongen (NL); Jan Matthijs Jetten, Zeist (NL)

(73) Assignee: SCA Hygiene Product Zeist B.V., AJ Zeist (NL)

( * ) Notice: Subject to any disclaimer, the term of this patent is extended or adjusted under 35 U.S.C. 154(b) by 0 days.

(21) Appl. No.: 09/980,789

(22) PCT Filed: Jun. 7, 2000

(86) PCT No.: PCT/NL00/00386

§ 371 (c)(1),
(2), (4) Date: Dec. 6, 2001

(87) PCT Pub. No.: WO00/75070

PCT Pub. Date: Dec. 14, 2000

(30) Foreign Application Priority Data

Jun. 7, 1999 (EP) .............................. 99201808

(51) Int. Cl.[7] ......................... C08B 31/18; C08B 33/08; C08B 35/08
(52) U.S. Cl. .................. 536/124; 536/102; 536/104; 536/105; 536/18.5; 536/123.1; 423/476; 562/419
(58) Field of Search ................. 536/102, 104, 536/105, 18.5, 123.1, 124; 423/476; 562/419

(56) References Cited

FOREIGN PATENT DOCUMENTS

| EP | 0913358 A1 | 5/1999 |
| NL | 8802907 | 6/1990 |
| WO | 98/27118 | 6/1998 |

OTHER PUBLICATIONS

"Chemical Process for making dialdehyde starch", T.A. McGuire et al.; Starch Starke., vol. 23, No. 2, 1971 pp. 42–45.

"Preparation and Calcium Complexation of Oxidized Polysaccharides", M. Floor et al.; Starch Starke, vol. 41, No. 9, Sep. 1, 1989, pp. 348–354.

Primary Examiner—Samuel Barts
Assistant Examiner—Michael C. Henry
(74) Attorney, Agent, or Firm—Burns, Doane, Swecker & Mathis, L.L.P.

(57) ABSTRACT

The invention pertains to a process for the regeneration and recovery of periodate from a spent iodate solution, by reacting the iodate with at least an equimolar amount of hypohalite, and carrying out the recovery in the presence of a water-miscible organic solvent or potassium ions or divalent metal (especially calcium) ions. The regenerated periodate is especially suitable for oxidising carbohydrates to dialdehyde carbohydrates.

11 Claims, No Drawings

PROCESS FOR REGENERATING PERIODIC ACID

This is the National Phase Application of PCT/NL00/00386, filed Jun. 7, 2000.

The invention relates to a process for regenerating periodic acid with a hypohalite and to a process of oxidising carbohydrates with periodic acid with regeneration and recovery of the periodic acid.

Periodic acid is extensively used for oxidising vicinal diols resulting in dialdehydes according to the following reaction:

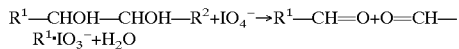
$R^1$—CHOH—CHOH—$R^2$+$IO_4^-$→$R^1$—CH=O+O=CH—$R^1$·$IO_3^-$+$H_2O$

Instead of periodate ($IO_4^-$), the actual oxidising species can be para- or meta-periodate ($H_nIO_6^{(5-n)-}$), which formally results from addition of hydroxyl ions to the periodate ion. In the present description, all such oxoiodate species of heptavalent iodine, whether in neutral or en deprotonated form, are referred to as periodate. Usually, the two groups $R^1$ and $R^2$ are part of the same ring system, such as in carbohydrates. The most common process in which periodate is used as an oxidising agent is the oxidation of starch to dialdehyde starch (DAS), which is used as a wet strength additive for paper, or cain be further oxidised to calcium-binding dicarboxy starch.

As periodate is an expensive oxidising agent, the spent oxidising agent, i.e. iodate, should be regenerated to periodate. This is usually done by oxidation with hypochlorite, as described by McGuire and Meltretter, Die Starke, 23, (1971) 42–45. According to this method, spent iodate is treated with 1.5 eq of sodium hypochlorite at pH 13–14 and at 90–95° C. for 40 min resulting in an average recovery of 97.6% periodate.

Although the prior art method already allows extensive regeneration of periodate, a loss of 2–3% of periodate for each oxidation cycle is still a problem for large-scale oxidation processes. Moreover, the regeneration conditions of the prior art method are rather severe (high temperature and high pH), thus adding to the cost of regeneration.

It was found according to the invention that the economy of the regeneration process of periodate using hypohalite can be improved by adjusting the aqueous medium of the regeneration so as to facilitate a physical separation of the regenerated periodate. The aqueous medium is adjusted by adding an agent that enhances precipitation of periodate, such as a water-miscible organic solvent or, in particular potassium ions and/or divalent ions such as calcium ions to the regeneration liquid.

An important advantage of the process of the invention is an increased yield of regenerated periodate. The yield is practically 100% ($\geqq$99%). Such yields can be achieved at moderate pH, e.g. pH 10. Preferably the pH is between 7 and 11.5, most preferably between 9 and 11; it may be higher than 11.5, with even further enhanced yield, but with concomitant consumption of alkali. The temperature can also be moderate, i.e. below 80° C. A temperature between 20 and 70° C. can advantageously be used. Also, the high yields can be achieved using a relatively low amounts of hypochlorite (5–40% especially about 30% excess). As a further advantage, the oxidation product is free of iodate, whereas the prior art product usually contains traces of iodate.

The ions to be used include potassium and heavier alkaline metals ions such as rubidium and cesium, and divalent ions, e.g. alkaline earth ions or other ions such as zinc, lead and the like; preferred ions are potassium and the alkaline earth metals, such as strontium, barium and particularly calcium and magnesium; most preferred is potassium. The amount of these ions is at least 0.5 eq with respect to the iodate to be reoxidised (or to the periodate to be regenerated). In particular, the amount of ions such as potassium, calcium and/or magnesium is between 1 and 4 molar equivalents with respect to the iodate/-periodate. Other ions, in particular sodium ions, may also be present, but preferably less than 2 moles, especially less than 1 mole per mole of iodate and/or less than the equivalent amount of potassium and/or divalent ions. If necessary, the separation between periodate and oxidation product can be enhanced by addition of organic solvents such as alcohols to the oxidation medium.

Water-miscible organic solvents to be added include lower alcohols such as methanol, ethanol, 2-propanol and methoxyethanol, ethers such as dioxane and dimethoxyethane, ketones such as acetone, and the like.

The oxidising agent to be used for reoxidising the iodate is a hypohalite, including hypochlorite, hypobromite and, though somewhat less preferred, hypoiodite. The term hypohalite covers both ionic hypohalite salts such as sodium, potassium and calcium salts and undissociated hypohalites such as hypohalous acids and esters. Hypochlorite is preferred for economic reasons. The hypohalite may be added as such, or may be produced electrochemically, i.e. by passing an electric current through a solution containing an alkali metal halide or an alkaline earth metal halide.

The regenerated periodate is particularly suitable for the oxidation of carbohydrates to produce carbohydrate dialdehydes, such as members of the starch family (starch, amylose, amylopectin, hydrolysates and derivatives thereof), cellulose, other glucans, galactomannans (guar, locust bean gum), fructans (inulin), xylans, and the like, and alkylated, carboxyalkylated, hydroxyalkylated and other derivatives thereof provided they contain vicinal diol groups (—CHOH—CHOH—). Starch and starch derivatives and cellulose are especially preferred. It is observed that where the carbohydrate oxidation product is soluble in the reaction medium such as with low molecular weight carbohydrate dialdehydes, an effective separation of oxidation product (dialdehyde) and iodate can be achieved by precipitating the iodate, e.g. by addition of potassium, calcium or magnesium ions or an organic solvent such as ethanol. The precipitated iodate is then reoxidised by redissolution and oxidation as described above.

The dialdehyde oxidation products thus obtained can be used for various purposes, e.g. as a crosslinking agent, as an additive e.g. in glues, coatings, thickeners, and the like, or as a carrier material e.g. for proteins. They may also be used as starting material for producing dicarboxy carbohydrates, which are suitable e.g. as calcium binding agents. The dicarboxy carbohydrates can be conveniently prepared from the dialdehyde carbohydrates by oxidation with usual oxidising agents, in particular sodium chlorite. The dicarboxy starches that can be obtained from the dialdehyde starches prepared by using extended periodate oxidation periods (e.g.

4–8 days) have an unexpectedly high calcium-binding power, as measured by their sequestering capacity (SC) of at least 2.8, especially at least 3.0 mmol Ca/g.

EXAMPLE 1

Iodate to Periodlate

To a solution of 5 g potassium iodate (Aldrich, 99%, 23.15 mmol) in 100 ml water, 15 ml of a sodium hypochlorite solution (Boom, Meppel, NL, 2.15 M=1.39 eq) was added. The mixture was allowed to react for 20 hours at 60° C. The pH was maintained at 11 by addition of 1 M sodium hydroxide solution, controlled by a pH stat (27.4 mmol of NaOH was added). A white precipitate formed during the reaction. After the reaction, 3 g of potassium chloride was added and the solution was cooled to room temperature. After standing for 20 hours, the precipitate was collected by filtration. It was dissolved in 6 M hydrochloric acid and the periodate content was determined by iodometric titration to be 23.0 mmol (184 meq). The isolated yield was thus 99.4%±0.3%.

EXAMPLE 2

Iodate to Peiotlede

Example 1 was repeated, however, using 150 ml of water and 20 ml of sodium hypochiorite solution (1.26 M=1.09 eq). The precipitate formed without addition of potassium chloride amounted, according to titration, to 15.6 mmol of periodate. In the filtrate, 7.4 mmol of periodate was found to be present. After addition of calcium chloride solution (1.5 g in 10 ml water) an additional precipitate formed (7.2 mmol). The final filtrate and washings contained 0.24 mmol of periodate. The total yield was thus 98.9%.

EXAMPLE 3

Iodate to Petiodate

Example 1 was repeated, however, using 23.4 mmol of iodate and 30.8 mmol of sodium hypochlorite solution (=1.32 eq). The precipitate formed after addition of potassium chloride was washed with water a few times. The isolated yield was 99.4%±0.3%.

EXAMPLE 4

Starch to Dicarbox Starch

To a solution of 5 g potassium iodate (99%, 23.13 mmol) and 5 g potassium chloride in 50 ml water, 15 ml of a sodium hypochlorite solution (31.5 mmol=1.36 eq) was added at 60° C. and pH 10. The pH was maintained at 10 by addition of 1 M sodium hydroxide solution (23.4 ml). After 20 hours the precipitate was collected by filtration and repeatedly washed with water. It was dissolved in diluted hydrochloric acid and the periodate content was determined by iodometric titration to be 23.0 mmol (184 meq). The isolated yield was thus 99.4%±0.3%.

The pH of the periodate solution was brought to 5 and the solution was cooled to 40° C. in the dark. After cooling 3.24 g of starch (dry weight, 20 mmol of anhydroglucose units) was added and the solution was stirred in the dark for four days. The DAS was filtered off on a glass funnel and rinsed with water until it was free of iodate and periodate. The filtrate was concentrated to 100 ml by evaporation and the amount of iodate was measured. The iodate was oxidised as described above using the same amounts of chemicals. Another batch of starch was oxidised with the regenerated and recovered periodate and the whole procedure was repeated once more. The three batches of oxidised starch (DAS) were further oxidised to dicarboxy starch (DCS) using chlorite/peroxide at pH 5 according to the method of Floor et al (Recl. Trav Chim. Pays Bas 108, 348 (1989). One mole of chlorite and one mole of peroxide were added to one mole of aldehyde at pH 5. The reaction was carried out for 24 h and the calcium binding capacity of the product was determined after desalting (nanofiltration) according to standard methods. The results of the respective conversions are summarised in table 1.

TABLE 1

| oxidation | iodate (mmol) | periodate (mmol) | yield (%) (1) | yield of DCSNa (g) | SC (mmol Ca/g) (2) | total SC (mmol Ca/batch) |
|---|---|---|---|---|---|---|
| 1 | 23.13 | 23.00 | 99.4 | 4.30 (91%) | 3.25 | 14.0 |
| 2 | 23.30 | 23.16 | 99.5 | 4.32 (91.5%) | 3.13 | 13.5 |
| 3 | 23.33 | 23.25 | 99.7 | 4.30 (91%) | 3.11 | 13.4 |

(1) determined by titration, versus theory
(2) 100 mg DCS was titrated with 0.4M $CaCl_2$ to the level of 1 10' $CaCl_2$ in solution, according to Floor et al, Rec. Trav. Chim. Pays Bas 108, 348 (1989).

What is claimed is:

1. A process for regeneration and recovery of periodate from a spent iodate solution, by reacting the iodate with at least an equimolar amount of hypohalite, wherein the recovery is carried out in the presence of a water-miscible organic solvent or potassium ions or divalent metal ions.

2. A process according to claim 1, in which at least 0.5 mole of potassium or alkaline earth metal ions per mole of iodate is used.

3. A process according to claim 1, in which the regeneration is carried out in the presence of potassium, calcium or magnesium ions.

4. A process according to claim 1, in which the regeneration is carried out at a temperature between 20 and 70° C.

5. A process according to claim 1, in which the regeneration is carried out at a pH between 7 and 11.5.

6. A process according to claim 1, in which 1.05–1.4 mole of hypohalite is used per mole of iodate.

7. A process for producing dialdehyde carbohydrates by oxidation of carbohydrates with periodate and regenerating periodate with a hypohalite, wherein the periodate is regenerated using the process of claim 1.

8. A process according to claim 7, in which the carbohydrate is starch.

9. A process according to claim 7, in which the dialdehyde carbohydrate is further oxidised to a dicarboxy carbohydrate.

10. Dicarboxy starch obtainable by the process of claim 9 and having a sequestering capacity (SC) of at least 2.8 mmol Ca/g.

11. A process according to claim 1, in which regeneration is carried out in the presence of potassium, calcium and magnesium ions.

* * * * *